April 14, 1931. R. A. KOTTKE 1,800,646
HOLDER FOR PANS AND COVERS
Filed Nov. 7, 1929
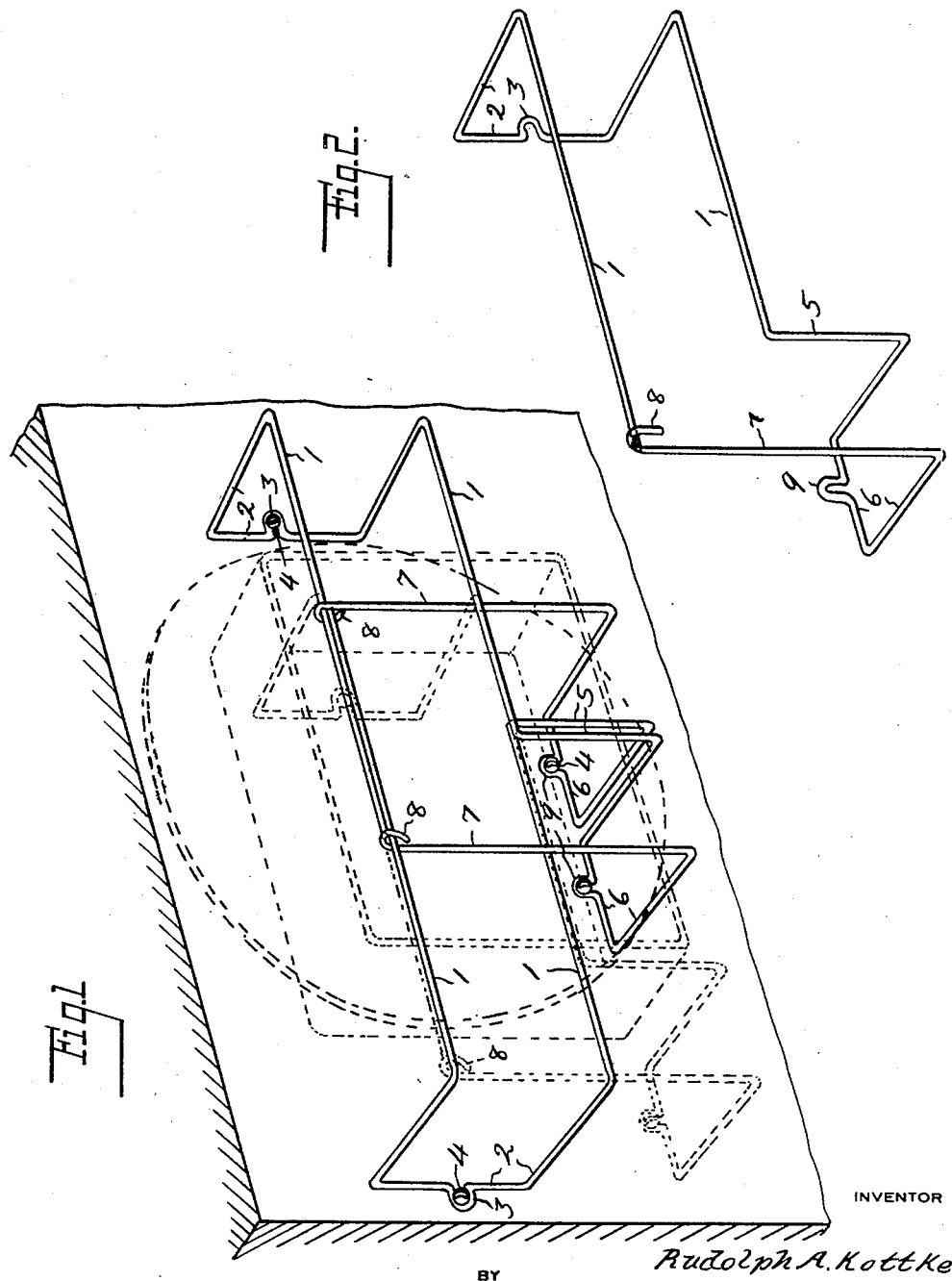
INVENTOR
Rudolph A. Kottke
BY
ATTORNEY Patented Apr. 14, 1931

1,800,646

UNITED STATES PATENT OFFICE

RUDOLPH A. KOTTKE, OF DETROIT, MICHIGAN

HOLDER FOR PANS AND COVERS

Application filed November 7, 1929. Serial No. 405,375.

This invention relates to kitchen accessories, and particularly to racks for holding bake pans, pan covers, and similar articles.

Among the objects of the invention are the provision of a rack for the aforesaid purpose that is simply and readily adjustable for mounting on different sizes of cupboard doors, that is inexpensively formed of wire, which has adequate strength to safely sustain a considerable weight, and is adapted in a simple manner to be secured to a door or wall.

Another object is to form such an article of a pair of wire units slidably interengaged to afford variation of the rack width, each unit having two U-shaped portions, one forming an end and the other a bottom portion thereof.

Still another object is to adapt two such units to be quickly and easily slidably interconnected.

These and various other objects the invention attains by the construction hereinafter described and illustrated in the accompanying drawing, wherein:

Fig. 1 is a perspective view of the rack mounted for use with a pan and cover therein, showing in dash lines an adjustment of the rack to an increased capacity.

Fig. 2 is a perspective view of one of the two complementary rack-forming units.

Referring now to structural details of said rack, the same is formed of two substantially similar units slidably connected to afford relative lateral adjustment, each being formed of a single length of wire. Thus, the units each comprise vertically spaced, horizontal front members 1 integrally connected at opposite ends of the rack by U-shaped members 2 forming supports for the rack, as well as constituting its ends. As illustrated, the rear portions of said U-shaped members are formed, preferably centrally, with loops 3 engageable by screws 4 or similar fastenings.

At its inner end, the lower member 1 of each unit is downwardly bent to form an upright 5, which is connected by a bottom-forming U-shaped member 6 with another front-forming upright 7, extending the full height of the rack and forming at its upper end a closed loop 8 slidably engaging the upper member 1 of the other unit. The inner end of the upper member 1 of each unit is preferably welded to the upper extremity of the upright 7 of the same unit.

Preferably, the U-shaped members 6 in addition to forming the rack bottom, furthermore serve as supports for the rack auxiliary to the members 2, their rear portions being, for this purpose, upwardly looped, preferably centrally of said portions, as indicated at 9, for engagement by additional screws 4 or the like.

Preliminary to fastening the described rack to a door or wall, the two units thereof are relatively laterally adjusted according to the size of said door or of the space to receive the rack. The construction is peculiarly adapted to be attached to the inside face of the door of a kitchen cabinet.

The formation of the described rack with U-shaped supporting portions at its ends, and with two additional U-shaped supports at its bottom, permits the rack to be so securely attached to a door or other support as to easily sustain a considerable weight. It is to be noted that square or round pans or covers can be equally well stored in said rack, and that in any position of its adjustment, the spaces between the two bottom-forming members and between the latter and the end-forming members are not sufficient to allow small pans or covers to fall out.

A desirable feature of the invention is the ease with which its two units may be operatively assembled. Thus, it is necessary in forming each unit to merely leave the loops 8 open, so that each upper member 1 may be engaged in said loop of the other unit. Said loops are substantially closed by any suitable implement, to maintain the described assembly. By thus avoiding employment of any loops at intermediate points in the lengths of wires forming the units, for the purpose of interconnecting the latter, and by employing only right angle bends in forming the U-shaped portions 2 and 6, the construction is adapted to be manufactured by relatively simple and inexpensive machinery.

While it is apparent that the illustrated embodiment of my invention herein disclosed is well calculated to adequately fulfill the objects and advantages primarily stated, it is to be understood that the invention is susceptible to variation, modification or change within the spirit and scope of the subjoined claims.

What I claim is:

1. A rack comprising elongated spaced upper and lower members extending at the front of said rack, a U-shaped member rearwardly extending from and connecting said elongated members at corresponding ends thereof to form one end of the rack, a pair of spaced uprights respectively rigidly connected to the other ends of said elongated members, and another U-shaped member connecting the lower ends of said uprights and rearwardly extending therefrom to form a bottom element of the rack.

2. A rack as set forth in claim 1, each of said U-shaped members being formed in its rear portion with a loop for engagement by a fastener.

3. A rack comprising upper and lower spaced elongated members extending at the front of the rack, a pair of U-shaped members rearwardly extending from and connecting said members at each end of the rack, and a pair of substantially U-shaped members carried by said elongated members and relatively adjustable longitudinally of the rack, said last named U-shaped members forming the rack bottom.

4. A rack comprising two units, each formed by upper and lower elongated members and a pair of U-shaped members rearwardly extending from and connecting corresponding ends of said elongated members, and a pair of bottom-forming members, and means slidably interengaging one of said elongated members of one unit with the corresponding elongated member of the other.

5. A rack comprising two units, each formed by a single length of wire comprising upper and lower spaced elongated portions at the front of the rack, a U-shaped connection between corresponding ends of said elongated members forming an end of the rack, a pair of spaced uprights connected respectively to said elongated members, and a U-shaped connection between the lower ends of said uprights forming a bottom element of the rack, and means slidably interconnecting corresponding elongated members of the two said units.

6. A rack comprising two units, each comprised of a single length of wire having a bottom-forming and an end-forming portion and having adjacent elongated front-forming portions, the ends of each unit-forming wire meeting at the front of said rack and being rigidly connected, one of said ends being extended beyond the other, and looped to embrace said front-forming portion of the other unit to render said units relatively laterally adjustable.

7. A rack comprising elongated spaced upper and lower members extending at the front of the rack, said members being rearwardly bent at each end of the rack and integrally connected by a vertical member at the back of the rack, said vertical member being fashioned to form a securing portion, a pair of spaced uprights carried by and projecting below said elongated members, and spaced from the rack ends, bottom-forming members formed integral with and rearwardly bent from said uprights, and a member integrally connecting said bottom-forming members at the back of the rack and formed with a securing portion.

In testimony whereof I sign this specification.

RUDOLPH A. KOTTKE.